United States Patent [19]
Thornton et al.

[11] Patent Number: 4,772,443
[45] Date of Patent: Sep. 20, 1988

[54] THERMALLY FORMED FILTER

[75] Inventors: Donald I. Thornton, Warwick; Clarke A. Rodman, East Providence, both of R.I.

[73] Assignee: Allied Corporation, Morristown, N.J.

[21] Appl. No.: 940,173

[22] Filed: Dec. 10, 1986

Related U.S. Application Data

[63] Continuation-in-part of Ser. No. 772,987, Sep. 6, 1985, Pat. No. 4,629,474.

[51] Int. Cl.⁴ .............................................. B29C 59/00
[52] U.S. Cl. .................................... 264/119; 264/121; 264/DIG. 48
[58] Field of Search ................ 156/185, 245; 162/222; 264/109, 119, 121, DIG. 48

[56] References Cited

U.S. PATENT DOCUMENTS

| | | | |
|---|---|---|---|
| 3,947,207 | 3/1976 | Magidson et al. | 156/245 |
| 4,337,116 | 6/1982 | Foster et al. | 162/222 |
| 4,647,326 | 3/1987 | Pott | 156/185 |

Primary Examiner—Frank Sever
Attorney, Agent, or Firm—Ken C. Decker; William N. Antonis

[57] ABSTRACT

A fluid filter is formed by manufacturing an air laid batt containing randomly disposed structural fibers and a thermoplastic binder fiber. The interstices between the fibers are fixed by applying a latex resin to the batt, thereby fixing the pore sizes of the filtering media before the filtering media is molded. The filtering media is then molded into shape by using a plunger to tuck the media into an open cavity mold. The mold may be heated and pressure may be applied to the batt to mold the batt.

10 Claims, 2 Drawing Sheets

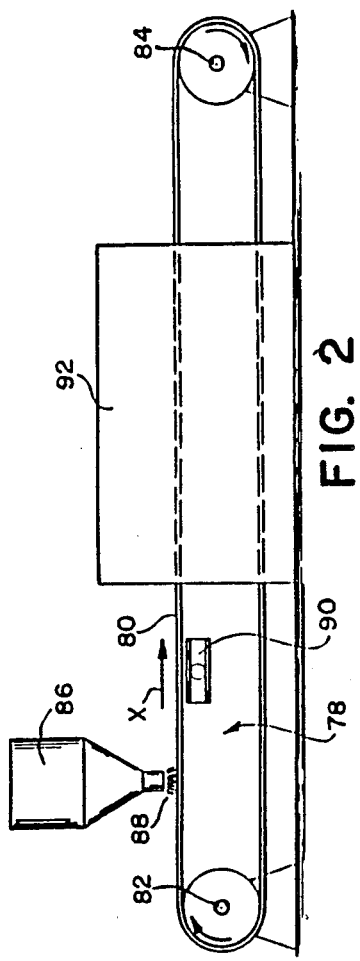
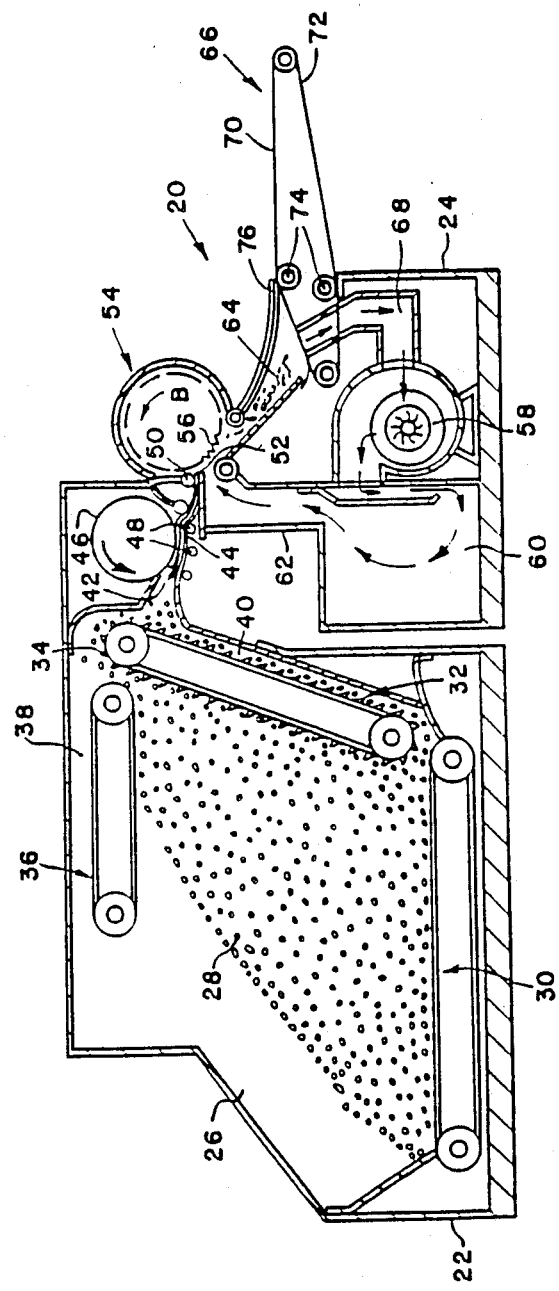
FIG. 1
FIG. 2

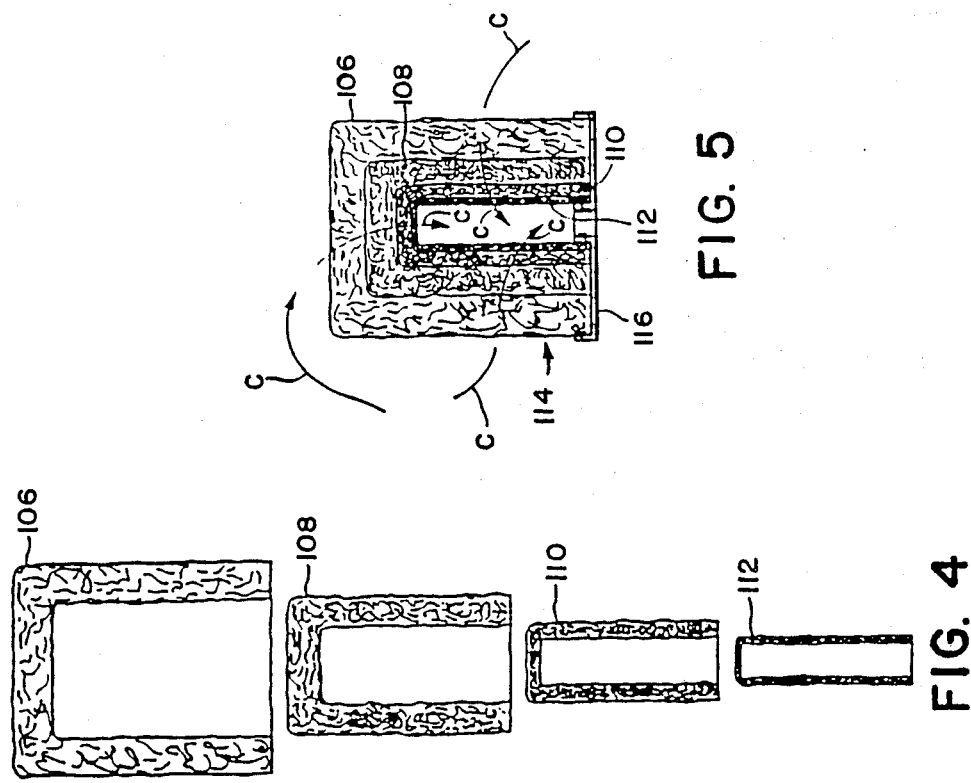
FIG. 5
FIG. 4
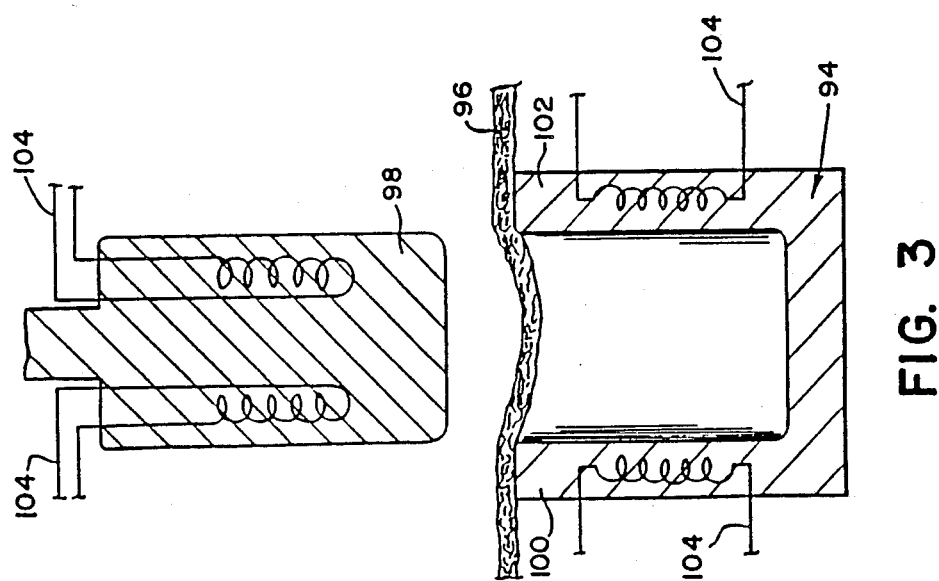
FIG. 3

THERMALLY FORMED FILTER

This application is a continuation-in-part of U.S. patent application Ser. No. 772,987, filed Sept. 6, 1985, now U.S. Pat. No. 4,629,474.

This invention relates to a method of manufacturing molded and formed filters, for use, for example, in the air induction system of a motor vehicle to filter combustion air, or as an oil or fuel filter.

Molded and formed filters, such as those disclosed in the above-identified applications or in U.S. Pat. No. 3,762,564, must be capable of being economically produced in large quantities with consistent filtering properties. It has been found that the filtering properties of a filter are a function of pore size. As discussed in the above-identified applications, the filtering medium consists of nonwoven batts manufactured from a randomly arrayed mixture of fibers, which are pneumatically conveyed and deposited on a foraminous conveyor, so that each of the fibers in the mixture interlock one or more times with other fibers. In order to permit molding, thermoplastic fibers may be included in the fiber mixture.

In forming such a batt into a filter, it has been found that it is relatively difficult to both control the pore size and mold the filter into the desired shape at the same time while maintaining a reasonably uniform pore size. Accordingly, the present invention solves this problem by locking the fibers to one another (and thus establishing the pore size) before molding the batt into the desired shape. Although the size of the interstices between the fibers established prior to molding may be changed somewhat during the molding process, the interstices in general remain the same size during molding, or are changed in a uniform, predictable, and controllable manner. The fibers are locked together, thus establishing the pore size, by applying a latex resin binder to the batt as it is formed. The size of the interstices between the fibers, and therefore the pore size of the finished filter, can be varied by using a larger or smaller quantity of resin, or by using fibers of smaller diameter to form a filter with finer pore size, or using fibers of greater diameter to form a filter of greater pore size.

It is also possible to achieve the same interlocking of the fiber structure to fix interstices between the fibers by using the thermoplastic binder fibers to fix the interstices by compressing the batt while heated to a temperature above the stick point of the binder fiber and then compacting the batt to the desired thickness by using unheated rollers. The batt can then be molded. The interstices may also be fixed by needlelocking a batt containing thermoplastic fibers to fix the interstices before molding. In fact, the interstices may be fixed by any mechanical entanglement process, such as needlelocking, locking on a needle loom, or hydroentanglement, before molding.

It is also a feature of the present invention to use a thermoplastic binder fiber in the fiber mixture from which the batt is formed. The binder fiber can be softened in a heated mold during molding. It is also necessary to tuck the batt into the mold during molding, to prevent stretching the batt from which the filter is being made, to thereby produce a filter of substantially uniform thickness while maintaining the pore size established when the batt is made and fixed with the thermoplastic resin. If stretching were permitted, the pore structure would be damaged in portions of the filter, thus a uniform pore size cannot be guaranteed. These and other advantages of the invention will become apparent from the following description with reference to the accompanyinq drawings, in which:

FIG. 1 is a cross-sectional illustration of the machine used to produce the air laid batt used in our invention;

FIG. 2 is a side view in elevation illustrating schematically the conveyor, the resin applicator, and the curing oven used in the present invention;

FIG. 3 is a diagrammatic illustration of the mold used to form the batt produced by the machine of FIGS. 1 and 2 into a filter;

FIG. 4 is an exploded view illustrating the articles produced by the mold illustrated in FIG. 3; and FIG. 5 is a cross-section view of the filter completed according to the present invention.

Referring now to the drawings, the method of the present invention comprises the steps of forming an air laid batt of randomly arrayed fibers using the machine illustrated generally in FIG. 1. The batt formed by this machine of FIG. 1 is then passed to the apparatus illustrated in FIG. 2, where a latex resin is applied to the batt and set to thereby fix the interstices between the fibers of the batt. The selected latex resin may have reactive sites which by cross-linking eventually cure the resin into a non-thermoplastic state. The batt is then molded into shape using the mold illustrated in FIG. 3. The various shapes of the filter are then nested as shown in FIG. 4 to form the completed filter illustrated in FIG. 5.

As illustrated in FIG. 1, an air laid nonwoven batt formation machine generally indicated by the numeral 20, of the type available commercially from the Rando Machine Corporation and generally illustrated in U.S. Pat. No. 3,918,126, includes two relatively large housings 22, 24. The housing 22 includes a relatively large hopper 26 which receives a fiber mixture generally indicated by the numeral 28. The fiber mixture 28 includes both thermoplastic fibers, such as vinyl fibers or fibers made from a thermal setting resin, and fibers which are not thermoplastic, such as, for example, wood pulp fibers or textile fibers. Although a wide range of the relative quantities of the different types of fibers is possible, it has been found that a mixture of about 30% thermoplastic fibers and the rest non-thermoplastic fibers achieves satisfactory results. A conveying apron 30 is operated by an appropriate power source (not shown) to move the fibers 28 to the right, viewing FIG. 1, toward an elevating apron generally indicated by the numeral 32. The elevating apron 32 is provided with spikes 34 so that the apron 32 conveys the fibers upwardly, viewing FIG. 1. A stripper apron generally indicated by the numeral 36 is mounted in the upper part of the hopper 26, viewing FIG. 1. A blower (not shown) provides metered air flow through the channel 38 defined between the upper race of the apron 36 and the corresponding portion of the housing 22. The metered air flow through the channel 38 removes fibers at a predetermined rate from the elevating apron 32. The remaining fibers are returned to the hopper 26 through the channel 40. The metered air flow passing through the channel 38 forces the other fibers into a duct 42. The air flow through the duct 42 enters a porous condenser screen 46, which rotates as indicated by arrow A. The feed mat 44 is formed between the screen 46 and mechanical rolls 48. The feed mat 44 is transferred by the mechanical rolls 48 to a feed roll 50 and is then passed over a conventional serrated nose bar 52. The fibers are brushed off the nose bar 52 by a conventional lickerin generally indicated by the numeral 54. The lickerin 54 is provided with a serrated surface defining spikes or teeth 56 across the entire width and around the circumference of the lickerin 54. The lickerin 54 is powered for rotation as indicated by the arrow B in FIG. 1.

The fibers are doffed from the lickerin 54 by the centrifugal forces generated by the rotating speed of the lickerin 54 and also by air flow provided by a blower 58. The blower 58 blows air into a chamber 60 defined within the housing 24. The air flow from the blower 58 is guided through a duct 62, around a portion of the surface of the lickerin 54, and into a duct 64. The fibers are removed from the lickerin and are conveyed by the air stream from blower 58 through the duct 64 to a foraminous conveyor generally indicated by the numeral 66. The inlet of the blower 58 is connected to a duct 68 which communicates with the duct 64 through a foraminous belt 70 comprising a part of the conveyor 66. Since the belt 70 is porous and permits air flow therethrough, the blower 58 is capable of circulating air through the ducts 62, 64 and 68. The foraminous belt 70 is mounted on guide rollers 72 which are driven by an appropriate motor (not shown). The nonwoven batt is formed on the foraminous belt 70 which includes a portion 74 extending from the dust cover 76.

The batt is then transferred from the foraminous belt 70 to the conveyor generally indicated by the numeral 78 in FIG. 2. Preferably, the conveyor 78 is placed at the end of the conveyor 70, so the batt is transferred directly from the machine illustrated in FIG. 1 to the mechanism illustrated in FIG. 2. Conveyor 78 comprises a belt 80 which mounted on rollers 82, 84. Accordingly, the batt moves in the direction indicated by the arrow X in FIG. 2. A latex thermoplastic or thermosetting resin is stored in hopper 86, and is dispensed upon the batt supported on the belt 80 through conventional spray nozzle 88. A vacuum puller 90 is disposed beneath the foraminous belt 80, and pulls the resin through the batt to make sure that the batt is saturated with the proper amount of resin. The excess resin pulled by the vacuum puller 90 is recirculated into the hopper 86 in a manner well known to those skilled in the art. The batt is then moved to a conventional oven 92 where the resin is wholly or partially cured. Of course, if the selected resin is self-curing, the oven 92 may be dispensed with. It should be noted that the belt 80 is of generally the same construction as the belt 70 in FIG. 1. That is, the belt 80 is of a generally foraminous construction of the type well known to those skilled in the art. The resin dispensed through the nozzle 88 onto the batt acts as a "glue" holding the randomly arrayed fibers of the batt in place.

By fixing the interstices between the fibers before molding, the pore sizes of the filter are established. Although there may be some change in the pore sizes during molding, particularly in the Z or height direction, the change will be uniform, predictable, and controllable by controlling the pressure and/or heat applied to the batt during molding. By fixing the size of the pores before molding, the filtering properties of the media are established and can be controlled. It was found that it was very difficult to control the pore sizes if they were not fixed before the media was molded. Accordingly, the filtering properties, if the pore sizes were not controlled, varied widely. Of course, the size of the interstices, and therefore the filtering properties, may be regulated by controlling the amount of latex resin applied to the batt, and/or controlling the size of the fibers from which the batt is made. For example, the interstices of a batt in which a large percentage of the fibers are of, say, 3DPF will be much smaller than interstices of a batt containing a larger percentage of 15DPF fibers.

The batt is then removed from the belt 80 and placed over the top of a conventional open cavity mold generally indicated by the numeral 94. As illustrated in FIG. 3, a surplus of unrestrained batt material is provided as at 96 so that the batt may be tucked into the mold 94 by a plunger 98 without stretching the batt. By providing the surplus at 96, the batt material can flow into the mold as the plunger 98 tucks the batt into the mold. The sidewalls 100, 102 of the mold are designed with sufficient clearance with the size of the plunger to exert a predetermined pressure on the batt section that is forced into the mold 94. Appropriate electrical resistance heaters, illustrated diagrammatically as at 104, heat the mold to a temperature that can be controlled by the operator. According to the invention, this temperature must be at least above the temperature at which the thermoplastic fibers which may be blended into the batt become tacky, thus permitting molding of the batt into the shapes illustrated in FIG. 4. To the extent that the latex resin applied to the batt has not cured, molding of the batt completes curing of the resin. Of course, it is within the scope of the invention, as disclosed in U.S. patent application Ser. No. 916,270 referred to hereinabove, to maintain either the plunger or the mold at different temperatures, to obtain the gradient density effects discussed in this aforementioned application. It is also within the scope of the invention, as discussed hereinabove, to compress the batt between the walls of the die and the plunger. As discussed above, the interstices between the fibers are fixed when the aforementioned latex resin is applied, but by compressing the batt, the interstices become more convoluted.

Although only a single mold 94 and plunger 98 are illustrated, it should be understood that a series of such molds and plungers will be necessary, because, pursuant to the invention articles made of different diameters will be required. Referring to FIG. 4, formed articles 106, 108, 110, and 112 are illustrated which were formed in corresponding sets of molds similar to the mold illustrated in FIG. 3, and vary in permeability, with article 106 being the most permeable and article 112 being the least permeable.

Referring to FIG. 5, the articles 106-112 have been assembled by nesting them together. Accordingly, a filter element generally indicated by the numeral 114 has been formed after the metallic endcap 116 has been assembled thereto. Of course, the element 114 would normally be housed in a metallic container, such as that shown in U.S. Pat. No. 4,144,168, with the necessary inlets and outlets and the necessary antidrainback and relief valves, etc. In conventional pleated paper filters of the same capacity, a metallic center tube is necessary to support the filter. However, at least the article 112 has sufficient stiffness to provide the necessary support while also acting as a part of the filtering media. Some of the necessary supports, springs, etc. used in prior art filters are also eliminated in the filter element illustrated in FIG. 5. Fluid is communicated through the filter element in the direction as indicated by the arrows C.

By way of illustration, but not by way of limiting the invention, there may be given the following example:

Using the apparatus in FIG. 1, an air laid batt is manufactured consisting of about 30% of binder fiber made from a vinyl polymer, known commercially as Vinyon, and with the remainder wood pulp fibers. The batt is treated with a latex resin and set using the apparatus illustrated in FIG. 2. A portion of the batt is then selected and placed over an open cavity mold as illustrated in FIG. 3. The batt is left unrestrained, so that the plunger 98 is able to tuck the batt into the mold without stretching or otherwise distorting the batt, so that the pore sizes remain fixed as in FIG. 2. The resin is fully cured when the molding process is completed. The article is removed from the mold after molding, and is then assembled with other articles as illustrated in FIG. 4 to form the completed filter article illustrated in FIG. 5.

We claim:

1. Method of forming a fluid filter comprising the steps of regulating and controlling the pore size of a nonwoven batt comprising a randomly arrayed mixture of separated fibers, said fibers having interstices therebetween, molding said batt into the desired shape of a fluid filter, fixing the interstices by including a binder material in the batt before molding said batt into the desired shape, and tucking said batt into a mold before the batt is molded into the desired shape to permit the batt to flow into the mold to prevent stretching of the batt as it is molded.

2. Method of forming a fluid filter as claimed in claim 1, wherein the step of fixing the interstices includes the the step of applying a thermally responsive resin to the batt after the batt is formed, and then setting the resin.

3. Method of forming a fluid filter as claimed in claim 2, wherein the batt is formed by pneumatically conveying said mixture of fibers to a conveyor, and randomly depositing said fibers on said conveyor.

4. Method of forming a fluid filter as claimed in claim 3 wherein said mixture of fibers includes both thermoplastic fibers and fibers which are not thermoplastic, said method including the step of heating the batt while molding the latter to a temperature at least equal to the temperature at which the thermoplastic fibers become tacky.

5. Method of forming a fluid filter as claimed in claim 4, wherein said batt is compressed as the batt is molded.

6. Method of forming a fluid filter as claimed in claim 1, wherein the batt is formed by pneumatically conveying said mixture of fibers to a conveyor and randomly depositing said fibers on said conveyor.

7. Method of forming a fluid filter comprising the steps of regulating and controlling the pore size of forming a nonwoven batt of individual fibers by pneumatically conveying a mixture of fibers to a conveyor, randomly depositing said fibers on the conveyor to form a batt consisting of a mixture of randomly arrayed fibers defining interststices therebetween, applying a binder material to the batt as it is formed to fix the interstices, and molding the batt after the interstices are fixed by tucking the batt into an open cavity mold to permit the batt to flow into the mold without restraint to prevent stretching of the batt as it is forced into the mold.

8. Method of forming a fluid filter as claimed in claim 7, wherein the binder material is a thermally responsive resin which is sprayed on the batt as it is formed.

9. Method of forming a fluid filter as claimed in claim 8, wherein said batt is heated as it is molded.

10. Method of forming a fluid filter as claimed in claim 7, wherein the binder material is a thermally responsive resin which is applied to the batt as it is formed, and said mixture of fibers includes both thermoplastic fibers and fibers which are not thermoplastic, said method including the step of heating said batt as it is molded to a temperature at least equal to the temperature that the thermoplastic fibers become tacky.

* * * * *